(12) United States Patent
Wang et al.

(10) Patent No.: US 8,954,632 B2
(45) Date of Patent: Feb. 10, 2015

(54) SYSTEM METHOD FOR REGULATING AN INPUT/OUTPUT INTERFACE BY SAMPLING DURING A TIME DURATION ASSOCIATED WITH I/O STATES

(71) Applicant: Silicon Laboratories Inc., Austin, TX (US)

(72) Inventors: Xiaohui Wang, Austin, TX (US); Paul I. Zavalney, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 54 days.

(21) Appl. No.: 13/731,253

(22) Filed: Dec. 31, 2012

(65) Prior Publication Data

US 2014/0189162 A1    Jul. 3, 2014

(51) Int. Cl.
*G06F 13/28*    (2006.01)
*G06F 13/00*    (2006.01)

(52) U.S. Cl.
USPC ................... 710/19; 710/18; 710/20; 710/21; 710/22

(58) Field of Classification Search
USPC ...................................................... 710/18–22
See application file for complete search history.

(56) References Cited

U.S. PATENT DOCUMENTS

| | | | | |
|---|---|---|---|---|
| 7,571,266 B2 * | 8/2009 | Carlson | | 710/62 |
| 8,291,126 B2 * | 10/2012 | Zitlaw | | 710/5 |
| 8,339,072 B2 * | 12/2012 | Lin et al. | | 318/3 |
| 8,390,949 B2 * | 3/2013 | Ahmad et al. | | 360/75 |
| 2012/0110235 A1 * | 5/2012 | Hsieh et al. | | 710/316 |
| 2013/0311683 A1 * | 11/2013 | Mundt et al. | | 710/18 |

* cited by examiner

*Primary Examiner* — Tammara Peyton
(74) *Attorney, Agent, or Firm* — Trop, Pruner & Hu, P.C.

(57) ABSTRACT

An apparatus includes an input/output (I/O) interface circuit that includes a memory and a controller. The memory stores a plurality of commands to regulate an input/output (I/O) interface. The commands indicate at least one I/O state of at least one I/O terminal of the I/O interface circuit and a time duration that is associated with the I/O state. The controller executes the commands to place the I/O interface in the the I/O state(s) in a predetermined sequence.

19 Claims, 6 Drawing Sheets

SYSTEM METHOD FOR REGULATING AN INPUT/OUTPUT INTERFACE BY SAMPLING DURING A TIME DURATION ASSOCIATED WITH I/O STATES

BACKGROUND

A typical microcontroller may contain a general purpose input/output (I/O) interface for purposes of communicating with devices that are external to the microcontroller. In this regard, the I/O terminals of the I/O interface may be used for such purposes as sampling analog signals; communicating digital signals; generating waveforms; providing signals that are used in connection with bidirectional communication lines (a bidirectional communication line of a serial bus, for example); and providing signals that are used for a control application.

As more specific examples, the I/O interface may generate signals for purposes of communicating over a serial peripheral interface (SPI) bus, communicating over a system management bus (SMB) or providing a universal asynchronous receiver/transmitter (UART) interface. As another example, the microcontroller may generate pulse width modulation (PWM) signals that may be used for motor control or switching regulator control applications.

SUMMARY

In an example embodiment, an apparatus includes an input/output (I/O) interface circuit that includes a memory and a controller. The memory stores a plurality of commands to regulate an input/output (I/O) interface. The commands indicate at least one I/O state of at least one I/O terminal of the I/O interface circuit and a time duration that is associated with the I/O state. The controller executes the commands to place the I/O interface in the the I/O state(s) in a predetermined sequence.

In another example embodiment, a technique includes storing a plurality of commands in a memory to regulate an input/output (I/O) interface circuit. Each command indicates at least one I/O state for at least one I/O terminal of the I/O interface circuit and a time duration that is associated with the I/O state. The technique includes executing the commands using a controller of the I/O interface circuit to place the I/O interface circuit in the I/O state(s) according to a predefined sequence.

In yet another example embodiment, an apparatus includes an integrated circuit (IC) that includes an input/output (I/O) interface, a memory, a controller and a processor core. The memory is adapted to store a plurality of commands to regulate the I/O interface, and each of the commands indicates at least one I/O state of at least one I/O terminal of the I/O interface and a time duration that is associated with the I/O state. The controller is adapted to execute the commands without intervention by the processor core to place the I/O interface circuit in the I/O state(s) according to a predefined sequence.

Advantages and other desired features will become apparent from the following drawings, description and claims.

DETAILED DESCRIPTION

Techniques and systems are disclosed herein, which allow input/output (I/O) interface commands to be executed for purposes of controlling a general purpose I/O interface of a microcontroller unit (MCU). In this regard, the control techniques and systems that are disclosed herein permit an I/O interface to be used for such example purposes as deterministically generating waveforms, controlling a sampling protocol, bidirectional communication flow path control, sampling of input signals, and so forth. Moreover, the I/O interface commands may be executed by a general purpose I/O controller of the MCU, without involving the MCU's processor core in the command execution. Therefore, among the potential advantages of this arrangement, the timing of a signal waveform that is generated by the MCU may be tightly regulated, without being subject to, for example, uncertain delays or latencies (system bus delays, for example), which may otherwise be introduced by processor core I/O command execution. Moreover, the techniques and systems that are disclosed herein may be used to generate relatively accurate waveforms and may be used for purposes of random or pseudo random waveform generation. Other and different advantages are contemplated, and will become apparent from the following description.

Figure 1:
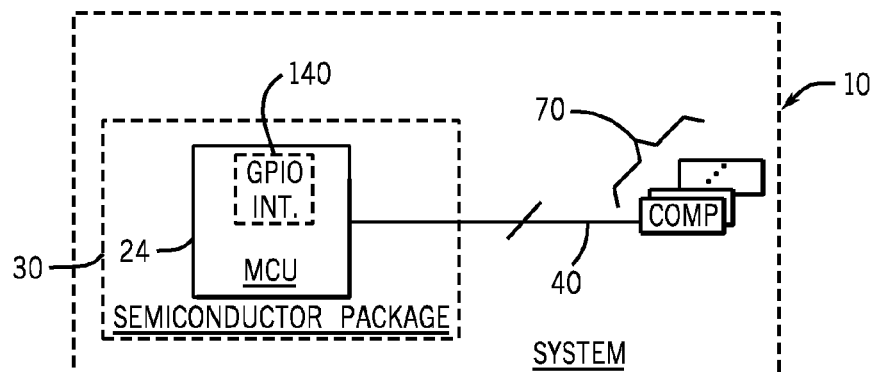
FIG. 1 is a schematic diagram of a system according to an example embodiment.

As a more specific example, FIG. 1 depicts an MCU 24 in an example system 10. For this example, the MCU 24 controls various aspects of one or multiple components 70. As examples, the components 70 may include one of more of the following depending on the particular application: an electrical motor, a household appliance, an inventory control terminal, a computer, a tablet, a smart power meter, a wireless interface, a cellular interface, an interactive touch screen user interface and so forth. All or part of the components of the MCU 24 may be part of an integrated circuit (IC), or semiconductor package 30. For example, all or part of the components of the MCU 24 may be fabricated on a single die or on multiple dies (a multi-chip module, for example) of the semiconductor package 30.

Figure 2:
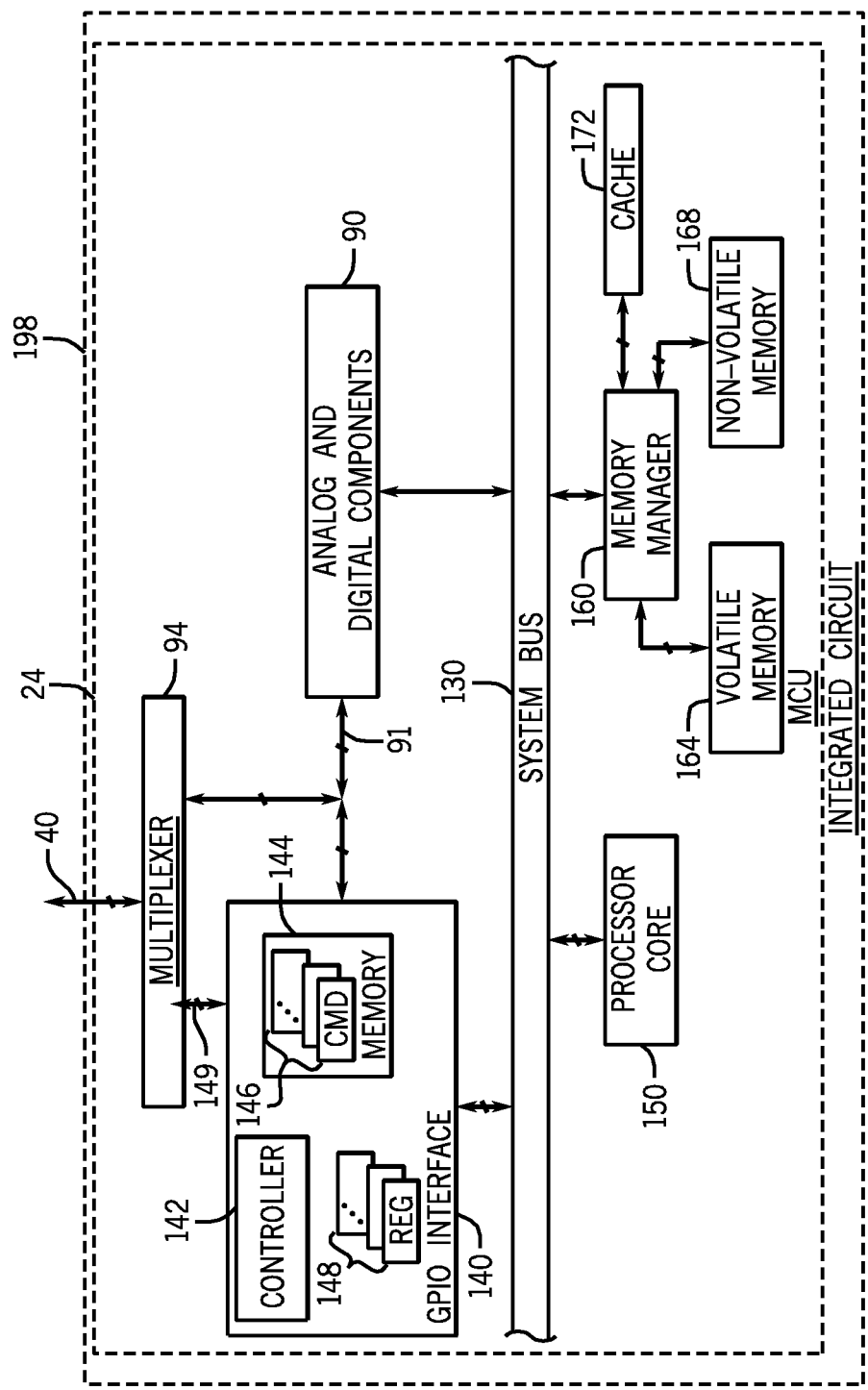
FIG. 2 is a schematic diagram of a microcontroller unit (MCU) according to an example embodiment.

As depicted in FIG. 1, the MCU 24 includes a general purpose I/O (GPIO) interface 140 for purposes of generating and receiving input and output signals via I/O terminals 40 to communicate with the components. Referring to FIG. 2, among its components, the MCU 24 includes a processor core 150 and the GPIO interface 140. Depending on the particular embodiment, the MCU 24 may not contain any of the components depicted in FIG. 2 other than the processor core 150 and the GPIO interface 140; may contain one or more of the components that are depicted in FIG. 2 in addition to the processor core 150 and the GPIO interface; may contain other and/or additional components than the components that are depicted in FIG. 2; and so forth. Thus, many embodiments are contemplated, which are within the scope of the appended claims.

As an example, the processor core 150 may be a 32-bit core, such as the Advanced RISC Machine (ARM) processor core, which executes a Reduced Instruction Set Computer (RISC) instruction set. In general, the processor core 150 communicates with various other system components of the MCU 24, such as a memory controller, or manager 160, over a system bus 130. In general, the memory manager 160 controls access to various memory components of the MCU 24, such as a cache 172, a non-volatile memory 168 (a Flash memory, for example) and a volatile memory 164 (a static random access memory (SRAM), for example).

It is noted that FIG. 2 depicts an exemplary or simplified representation of the MCU architecture, as the MCU 24 may have many other components, bridges, buses, and so forth, in accordance with further embodiments, which are not depicted in FIG. 2. For example, in accordance with some embodiments, the MCU 24 may have a bus matrix module that implements slave side arbitration and is used to regulate access to the memory devices of the MCU 24.

In accordance with some embodiments, the MCU 24 includes analog and digital components 90, which communicate analog and digital signals with I/O terminals 90. The analog components may include various components that receive analog signals, such as analog-to-digital converters (ADCs) and comparators; and the MCU 24 may contain analog components that provide analog signals, such as current drivers.

The digital components of the MCU 24 may communicate with the processor core 150 over the system bus 130. As examples, the digital components may include a Universal Serial Bus (USB) interface, a universal asynchronous receiver/transmitter (UART), a system management bus interface (SMB), a serial peripheral interface (SPI), and so forth. In general, these digital components communicate with devices that are external to the MCU 24 via I/O terminals 91.

In accordance with an example embodiment, the MCU unit 24 includes a multiplexer 94, which permits the programmable assigning of selected I/O terminals 91 to GPIO terminals 40, 50. In this regard, the MCU 24 may contain one or more registers to permit the selective assignment of the I/O terminals 40 to the terminals 91 and the configuration of the terminals as being either dedicated input or output terminals via bits of the register.

As depicted in FIG. 2, the MCU 24 also includes the GPIO interface 140, which may be selectively assigned to one or more of the I/O terminals 91 (via one or more registers), for purposes of regulating associated states of these terminals 91 at corresponding I/O terminals 40, 50. In this regard, in accordance with example embodiments, the GPIO interface 140 includes one or multiple registers 148, which may be programmed for purposes of defining the I/O communication flow directions and configuring various aspects of the I/O terminal 91, as further disclosed below. In general, the GPIO interface 140 maps a given I/O terminal 91 to a given I/O terminal 149 and regulates the state of the I/O terminal 149, as disclosed herein. The I/O terminals 149 may be, in accordance with an example embodiment, furnished to the multiplexer 94, which may be used to selectively map the I/O terminals 149 to the external terminals 40, 50. For the exemplary embodiments disclosed herein, it is assumed that given I/O terminals 91 are configured by the register(s) 148 as being routed to the GPIO interface 140, which regulates the I/O states of the corresponding I/O terminals 40 and 50.

In accordance with an example embodiment, the GPIO interface 140 includes a memory 144 (a first in first out (FIFO)-based memory, for example), which stores I/O interface commands 146 to control the I/O states of the I/O terminals 149. In this regard, in accordance with an example embodiment, the memory 144 stores the commands 146 in a given predefined order so that the commands 146 are retrieved and executed by a controller 142 of the GPIO interface 140 in a predefined execution order, or sequence.

As further disclosed herein, each I/O interface command 146, when executed by the controller 142, controls the I/O state(s) of the set of I/O terminal(s) 149 that are designated to be controlled (by the corresponding configuration register bits) by the GPIO interface 140. For each I/O terminal 149 to be controlled, each I/O interface command 146 contains data that represents, or indicates, an associated I/O state for the I/O terminal 149 and data that represents, or indicates, a time duration for that I/O state. As further disclosed herein, the I/O state may be a state in which the I/O terminal 149 is driven to a particular logic value; a sampling state in which the I/O terminal 149 samples an external signal after a predefined duration of time; a state defining a sampling protocol; a state defining a bidirectional communication protocol; and so forth.

The time-successive execution of the I/O interface commands 146 by the controller 142, in accordance with example embodiments, occurs without intervention by the processor core 150. In this regard, in accordance with example embodiments, the controller 142 retrieves the I/O interface commands 146 from the memory 144 and executes the I/O interface commands 146 in a predefined execution order so that corresponding I/O states appear in a predefined sequence. A particular advantage of this arrangement is that the controller 142 may not use a bus having an unpredictable latency, such as the system bus 130, for example; and as such, the I/O states of the I/O terminals 149 may be regulated in a deterministic manner.

In accordance with example embodiments, as further disclosed herein, the GPIO interface 140 is constructed to perform direct memory access (DMA) to the volatile memory 164 for purposes of retrieving the commands 146 and storing the commands 146 in the memory 144. In this manner, in accordance with an example embodiment, the GPIO interface 140 may perform such a DMA access to replenish the commands 146, when the number of queued I/O interface commands 146 in the memory 144 decreases below a predefined threshold.

As an example, the processor core 150 may queue the commands in the non-volatile memory 164. In a further embodiment, the processor core 150 may periodically, or upon receiving an interrupt (as an example) from the GPIO interface controller 140 indicating replenishment of the commands 146 is requested, retrieve more I/O interface commands 146 (if available) from the volatile memory 164 and store the commands 146 in the memory 144 via write operations over the system bus 130. Thus, many variations are contemplated, which are within the scope of the appended claims.

Figure 3:
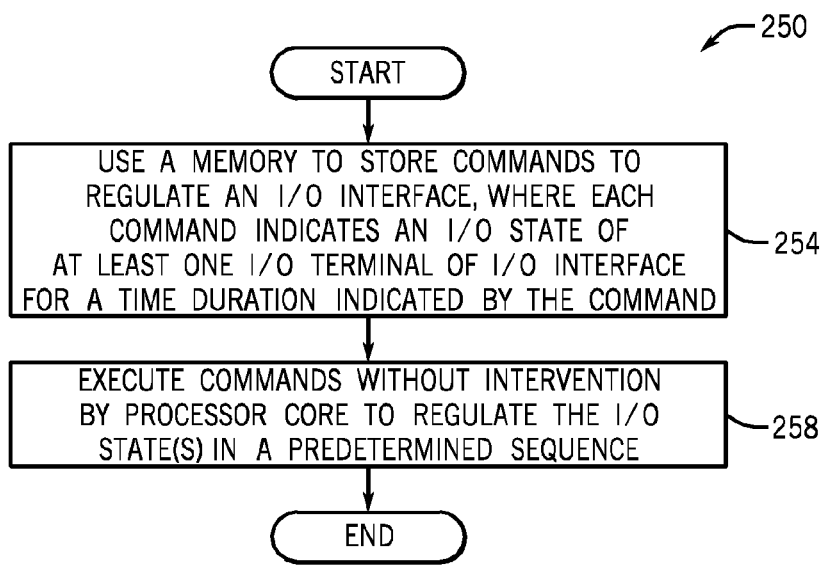
FIG. 3 is a flow diagram depicting a technique to regulate an input/output (I/O) interface of the MCU of FIG. 2 according to an example embodiment.

Thus, referring to FIG. 3, in accordance with example embodiments, a technique 250 includes using (block 254) a memory to store commands to regulate an I/O interface, where each command indicates at least one I/O state of at least one I/O terminal of the I/O interface for a time duration that is also indicated by the command. Pursuant to the technique 250, the commands are executed (block 258) without intervention by the processor core to regulate the I/O state(s) in a predetermined sequence.

Figure 4:
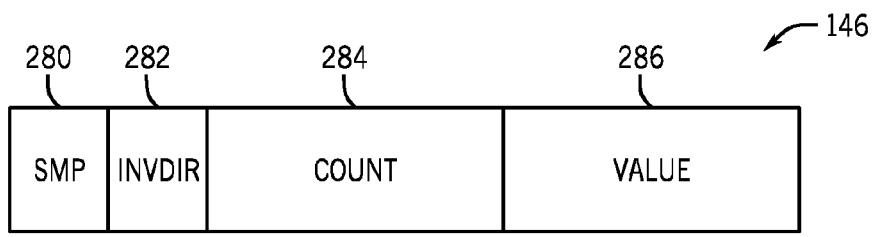
FIG. 4 is an illustration of a structure of an I/O interface command according to an example embodiment.

FIG. 4 depicts an example structure for the I/O interface command 146, in accordance with some embodiments. As an example, the command 146 may be a word, or 32-bits, although the command 146 may contain fewer or more than 32 bits, in accordance with other embodiments. For the example of FIG. 4, the command 146 includes a count field 284, which contains data indicating the duration of an associated I/O state. In some embodiments, the count field 284 contains data indicating the number of cycles of a given clock. The I/O interface command 146 further includes a value field 286, which contains data that represents, or indicates, the values to be driven to the I/O terminals 149 (see FIG. 2).

For example, in accordance with some embodiments, if the MCU 24 includes sixteen I/O terminals 149, the value field 286 is a sixteen bit data field containing, where each bit is either a "1" (i.e., a logic one) or a "0" (i.e. a logic zero). These logic states, in turn, control the I/O states of associated I/O terminals 149. For example, if the value field 286 contains a "1" bit, when a corresponding I/O terminal 149 is to be driven during the associated duration specified by the count field 284 to a logic one.

In addition to the I/O state and duration indicated by the value 286 and count 284 fields, the I/O interface command 146 may further contain one or multiple control bits, to further specify the I/O states of the I/O terminals 149. For example, in accordance with example embodiments, the command 146 may contain a field 282 (a one bit field, for example), which indicates or represents whether the communication flow directions of certain I/O terminals 149 are to be reversed, or inverted, during the associated duration specified by the count field 284.

More specifically, in accordance with example embodiments, invert field 282 is used in combination with one or multiple other "static" registers 148 (see FIG. 2) of the GPIO interface 140, such as a register 148 that indicates, on a bitwise level, whether corresponding I/O terminals 149 are subject to the inversion indicated by the field 282; and a communication flow direction register 148, which in general, statically indicates the communication flow direction, on a bitwise basis, for the corresponding I/O terminals 149.

In accordance with example embodiments, the following truth table describes the command syntax used in connection with the I/O interface command 146 and above-described registers:

TABLE 1

| invdiren | invdir | dir | value | gpio | gpio_out | gpio_oe |
|---|---|---|---|---|---|---|
| 0 | X | 1 | 0 | Drive 0 | 0 | 1 |
| 0 | X | 1 | 1 | Drive 1 | 1 | 1 |
| 0 | X | 0 | 0 | High Z | X | 0 |
| 0 | X | 0 | 1 | High Z | X | 0 |
| 1 | 1 | 0 | 0 | Drive 0 | 0 | 1 |
| 1 | 1 | 0 | 1 | Drive 1 | 1 | 1 |
| 1 | 0 | 0 | 0 | High Z | X | 0 |
| 1 | 0 | 0 | 1 | High Z | X | 0 |
| 1 | 1 | 1 | 0 | High Z | X | 0 |
| 1 | 1 | 1 | 1 | High Z | X | 0 |
| 1 | 0 | 1 | 0 | Drive 0 | 0 | 1 |
| 1 | 0 | 1 | 1 | Drive 1 | 1 | 1 |

In Table 1, "x" represents a high impedance state, "1" represents a logic one state and "0" represents a logic zero state; "invdiren" represents a corresponding bit of the static register 149 identifying whether inversion is permitted for the corresponding I/O terminal 149; "invdir" represents the value of the field 282 (see FIG. 4); "dir" represents the assigned static communication flow direction by the register 148; "value" represents the I/O state value of the field 286, "gpio" represents the corresponding I/O state of the I/O terminal 149; "gpio_out" represents the corresponding signal appearing on the I/O terminal 149; and "gpio_oe" represents an output enable state of the I/O terminal 149 (representing the output enable state of the corresponding buffer, or driver). Thus, using row four of Table 1 as an example, when the invdiren inversion enable bit is "0," the invert field 282 does not affect the I/O state. Conversely, using line ten of Table 1 as an example, when the invdiren invert enable bit is asserted, then an asserted invdir value for the field 282 causes the I/O terminal 149 to serve as an input terminal, although the dir bit indicates that the terminal 149 is an output terminal.

The command 146 may contain various other control fields, in accordance with further embodiments. For example, in a further example embodiment, field 286 (FIG. 4) of the command 146 may be used in a wait feature. In this manner, the field 286 may serve as a value to be matched, and the controller 142 may monitor the I/O terminals 149 and hold the execution of the command 146 until the match occurs. An external controller triggers the match by providing the match value (as signals) to the I/O terminals 149. The match may be configured by another static register (a wait mask register) to determine which one or many I/O terminals are to be monitored for the match value.

Figure 5:
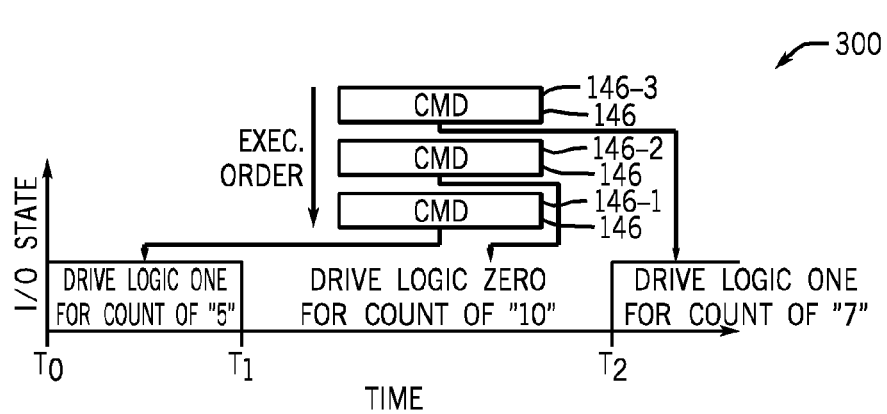
FIG. 5 is an illustration of use of the I/O interface commands to drive a signal onto an I/O terminal of the I/O interface according to an example embodiment.

FIG. 5 depicts an illustration 300 in which example I/O interface commands 146-1, 146-2 and 146-3 are used to generate a waveform on a corresponding I/O terminal 149. In this manner, as depicted in FIG. 5, the I/O interface commands 146-1, 146-2 and 146-3 are executed in a predefined execution order (as defined in the order in which the I/O interface commands 146 are stored in the memory 144, for example) such that I/O interface command 146-1 is executed first, the I/O interface command 146-2 is executed second and the I/O interface command 146-3 is executed last. At time $T_0$, the controller 142 executes the I/O interface command 146-1, which specifies that the terminal 149 is to be driven to a logic one for a duration of "5" (five clock cycles, for example). Thus, from time $T_0$ to time $T_1$, five clock cycles elapse, and at time $T_1$, the controller 142 executes the next I/O interface command 146-2 which now controls the I/O state of the I/O terminal 149.

As shown, for this example, the I/O interface command 146-2 specifies that the I/O terminal 149 is to be driven to a logic zero value for a count of "10" (i.e., ten clock cycles), which occurs between time $T_1$ to time $T_2$. At the expiration of the ten clock cycles at time $T_2$, the controller 142 executes the I/O interface command 146-3, which specifies that the I/O terminal 149 is to be driven to a logic one value for a count of 7." Thus, as a non-limiting example, FIG. 5 illustrates how a particular waveform, such as a PWM waveform (as an example) may be generated on a given I/O terminal 149 using the I/O interface commands 146 for a dedicated output terminal.

Other I/O terminals 149 may be designated input terminals. In this regard, the I/O interface commands 146 may be executed to regulate a sampling interval, such that after a predefined count period, the MCU 24 samples the value present on the I/O terminal 149. A given I/O terminal 149 may alternate between being designated as an input terminal and being designated as an output terminal, in accordance with some embodiments. In this manner, such an I/O terminal 149 may be used for bidirectional communication, such as a communication on a serial bus, handshaking, and so forth.

Figure 6:
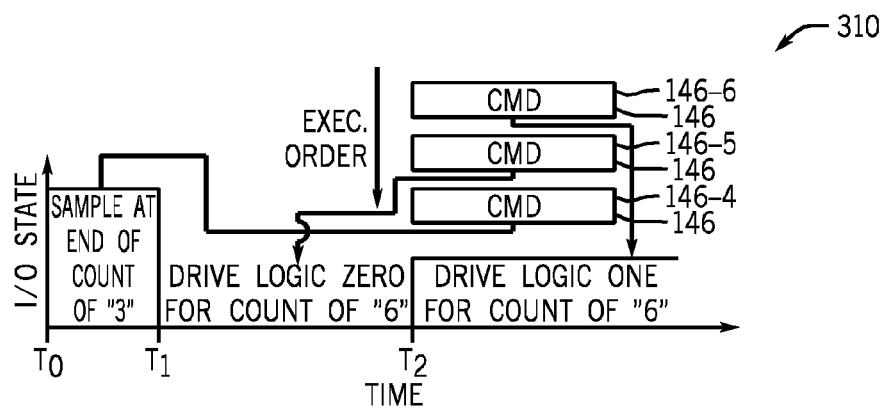
FIG. 6 is an illustration of the use of I/O interface commands to configure an I/O terminal of the I/O interface for bidirectional communication according to an example embodiment.

FIG. 6 depicts an illustration 310 of an I/O state for an associated I/O terminal 149 that is used both as an input terminal and as an output terminal. For this example, the controller 142 successively executes three I/O interface commands 146 in the following order: I/O interface command 146-4; I/O interface command 146-5; and I/O interface command 146-6. The execution of the I/O interface command 146-4 establishes the I/O terminal 149 as an input terminal from time $T_0$ to time $T_1$, where time $T_0$ to time $T_1$ is separated by a count of "3." In this regard, depending on the particular embodiment, the execution of the I/O interface command 146-4 may invert the communication flow direction of the I/O terminal 149 or not, depending on the statically-defined definition in the static GPIO register.

At time $T_1$, for this example, the controller 142 executes the I/O interface command 146-5, which causes the GPIO interface controller 140 to drive the I/O terminal 149 to a logic zero value for a count of "6," from time $T_1$ to time $T_2$. Thus, from time $T_1$ to time $T_2$, the I/O terminal 149 is an output terminal. This may be established by inverting the flow direction of the I/O terminal 149 (if statically configured as an input terminal), depending on the particular configuration. At time $T_2$, the controller 142 executes the command 146-6 which maintains the I/O terminal 149 as an output terminal but changes the value driven on the terminal to be a logic one value for count of "6."

As an example, from time $T_0$ to time $T_1$, the GPIO interface controller 140 may use the I/O terminal 149 to sense a signal driven by another entity; and the two subsequent logic zero and logic one levels may be used to acknowledge the sensed signal. Thus, the illustration 310 may be viewed as a handshaking example, although other applications of using the same I/0 terminal 149 as both an input terminal and as an output terminal may be employed, in accordance with further embodiments.

Figure 7:
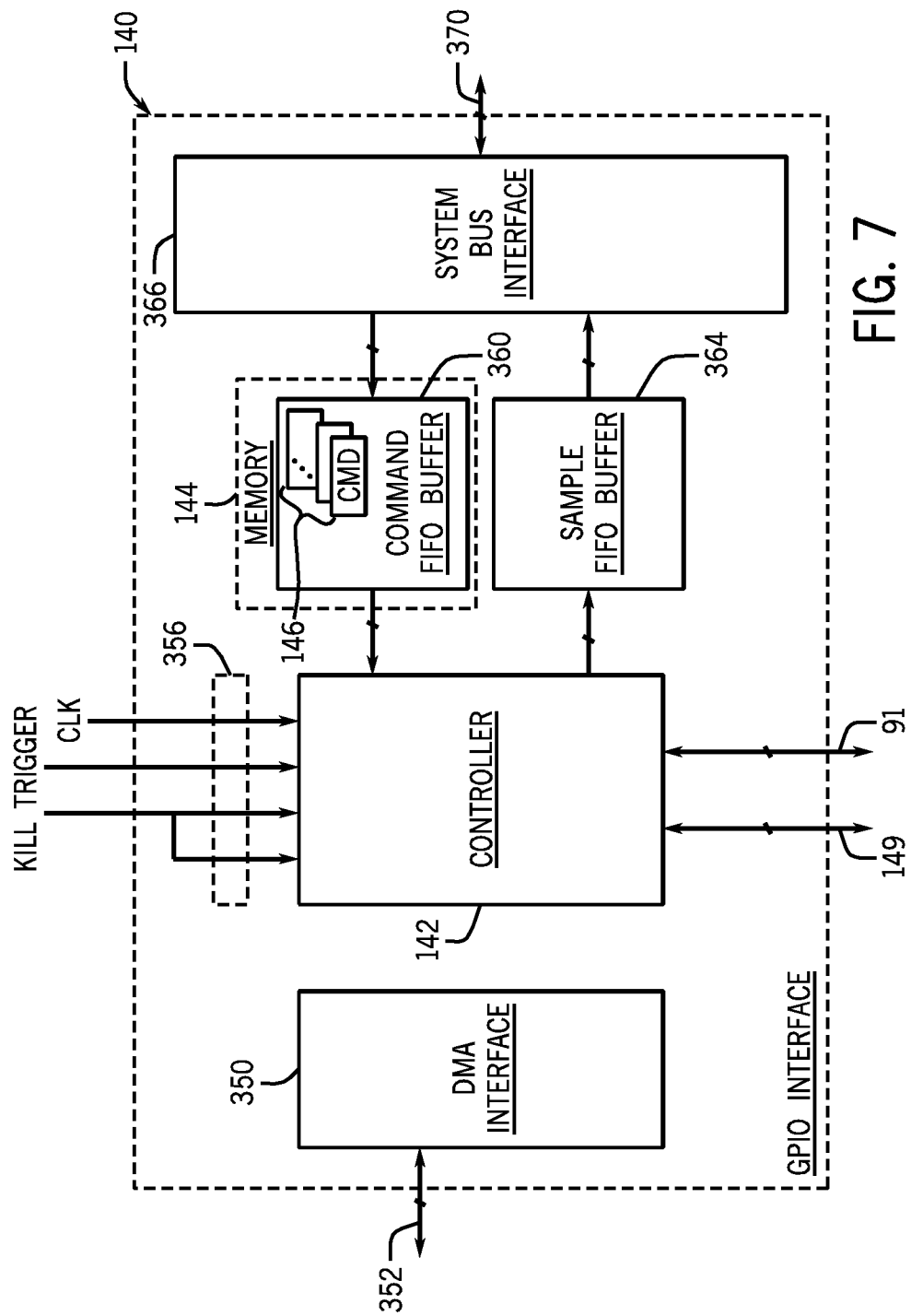
FIG. 7 is a schematic diagram of the I/O interface controller of FIG. 2 according to an example embodiment.

Referring to FIG. 7, in accordance with an example embodiment, the GPIO interface controller 140 includes two first in first out (FIFO) buffers: a command FIFO buffer 360, which forms at least part of the memory 144 and stores the I/O interface commands 146 to be executed by the controller 142; and a sample FIFO buffer 364, which stores data acquired by input I/O terminals 149. In general, the FIFO buffers 360 and 364 are coupled between a system bus interface 366 and the controller 142, as depicted in FIG. 7, in accordance with example embodiments. Thus, the FIFO buffers 360 and 364 accommodate, for example, different clock rates between the system bus 130 (see FIG. 2) and the controller 142.

In accordance with an example embodiment, the GPIO interface controller 140 further includes a DMA interface 350. In general, the DMA interface 350 is constructed to access the non-volatile memory 164 (see FIG. 2) when the number of commands in the FIFO buffer 360 falls below a predetermined threshold for purposes of retrieving, or fetching, more commands into the FIFO buffer 360. In this regard, the DMA interface 350 may communicate using various transmit and receive DMA requests and active communication lines 352. The lines 352 may communicate with an arbiter (not shown), in accordance with some embodiments. In further embodiments, the system bus interface 366 may be configured to allow the processor core 150 to access the command FIFO buffer 360 for purposes of replenishing or storing commands 146 in the FIFO buffer 360. Depending on the particular embodiment, the DMA interface 350 or the processor core 150 may access the sampled FIFO buffer 364 for purposes of retrieving flash furnishing the sampled data from the GPIO interface. Thus, many variations are contemplated, which are within the scope of the appended claims.

In accordance with example embodiments, the controller 142 is synchronized to a clock signal (called "CLK" in FIG. 7), which, in turn, may be synchronized to the clock of the system bus 130 (at the same frequency or another frequency, as desired). The controller 142 further receives a signal called "KILL," which, when asserted (driven to a logic one level, for example) causes the controller 142 to asynchronously transition the I/O states of the I/O terminals 149 to predetermined "safe" levels. In this regard, in accordance with example embodiments, a register 148 of the GPIO interface controller 140 may be programmed with bits that correspond to predetermined safe levels for corresponding I/O terminals 149. In general, a safe level causes no harm in the system in the event of a fault condition. For example, a safe level for a signal that is used to drive a switching transistor may be a logic one level, a level that turns off the switching transistor for this example. For other applications, a safe level for a given I/O terminal 149 may be a logic one level or, alternatively, a tri-state condition.

In some embodiments, the controller 142 is constructed to, in response to detecting the asserted KILL signal, maintain the I/O terminals 149 in their respective safe levels until the next I/O interface command 146 is executed. Thus, the safe levels remain for the duration of the current time interval for the most recently-executed I/O interface command 146. In further embodiments, the KILL signal may trigger a persistent kill state, a safe state in which the controller 142 maintains the I/O terminals 149 at their respective safe levels until the processor core 150 resets the GPIO interface 140. Thus, in the persistent safe state, the GPIO interface controller 140 is effectively disabled until further corrective action is taken by the processor core 150.

The safe state may be triggered internally by the controller 142, in accordance with further embodiments. For example, in accordance with some embodiments, upon detecting a logical combination of one or more input states (as sensed at the I/O terminals 149, for example), the controller 142 may initiate the KILL state. Thus, many variations are contemplated, which are within the scope of the appended claims.

In accordance with some embodiments, the controller 142 receives an external signal called "TRIGGER," which, when asserted (driven to a logic one level, for example), causes the controller 142 to begin executing the commands 146 stored in the command FIFO buffer 360. It is noted that in accordance with example embodiments, the controller 142 may begin executing the commands 146 in response to an internal trigger, such as a trigger generated in response to a certain combination of logic levels.

Figure 8:
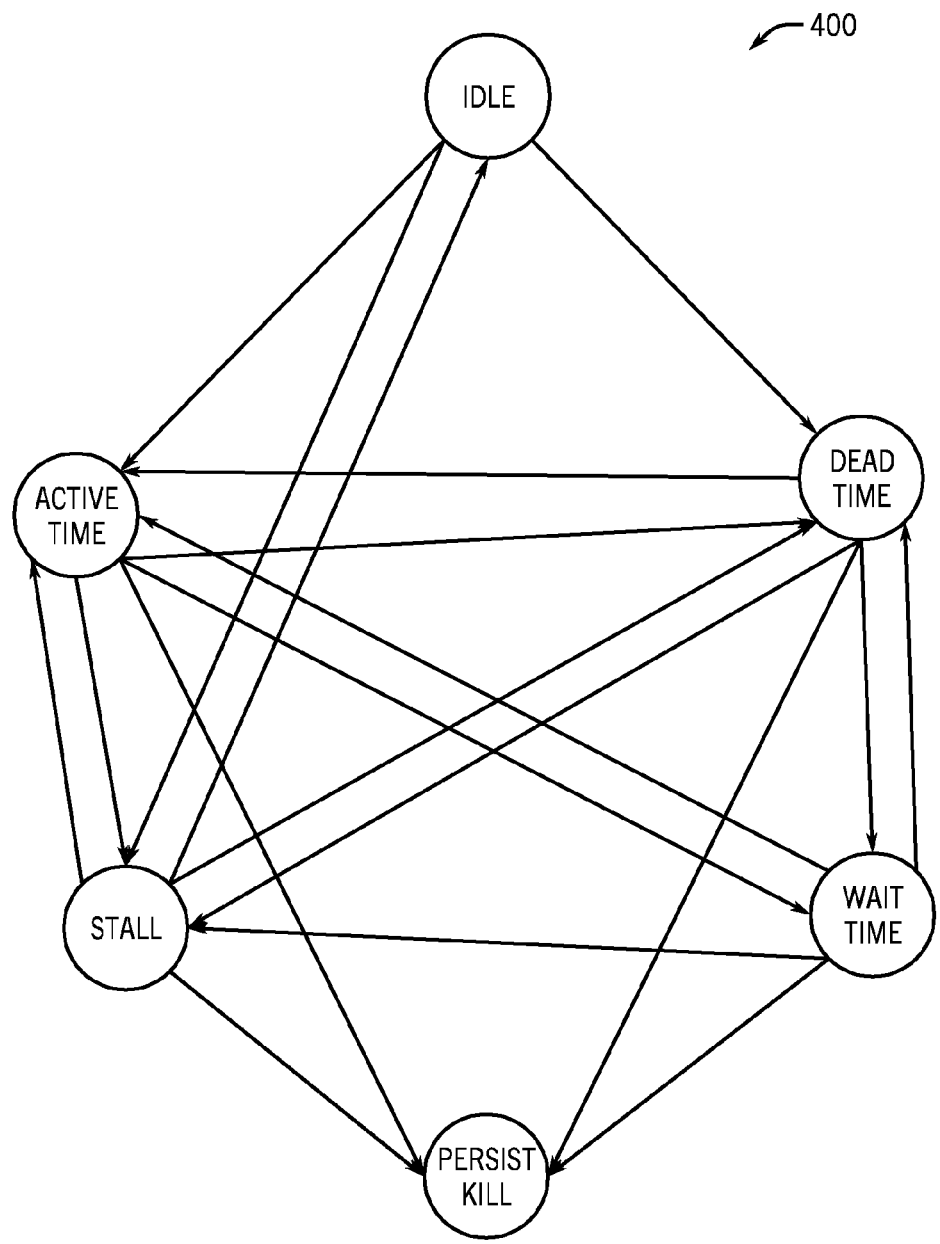
FIG. 8 is a state diagram of the I/O interface controller according to an example embodiment.

Referring to FIG. 8, in accordance with some embodiments, the controller 142 may have an associated state diagram 400. When powered up, the controller 142 enters an IDLE state where the controller 142 remains until a trigger event occurs, which controls the starting point of the I/O waveform on a cycle by cycle basis. As can be appreciated by the skilled artisan, the cycle by cycle control of the I/O waveform may be performed quite accurately, in accordance with example embodiments. In some embodiments, the controller 142 may (as configured by a particular register bit, for example) be constructed to insert a "dead time" interval at the beginning of certain cycles. This may be used, for example, when switching signals are generated for purposes of ensuring that certain switching signals do not overlap in time. Thus, when executing some commands that satisfy a certain combination of I/O levels, the controller 142 may initially transition to a DEAD TIME state for purposes of incurring the dead time at the beginning of the cycle.

From the DEAD TIME state or from the IDLE state, the controller 142 transitions, upon execution of a I/O interface command 146 to the ACTIVE TIME state, the state in which the controller 142 executes the I/O interface command 146, assuming no problems occur. For example, if a problem does occur, depending on the particular embodiment, the controller 142 may transition from the ACTIVE TIME to a PERSIST KILL state, a state where the controller 142 remains until reset by the processor core 150.

Thus, at the end of the cycle duration, the controller 142 may further transition from the ACTIVE TIME state to a WAIT TIME state for purposes of waiting for a particular logic level (to implement a handshaking protocol, for example). Upon receiving the input, the controller 142 transitions from the WAIT TIME state back to the ACTIVE TIME state. Thus, as depicted in FIG. 8, from the ACTIVE TIME state, the controller 142 may transition to the DEAD TIME state, the STALL state, the WAIT TIME state or the PERSIST KILL state.

The controller 142 enters the STALL state when the FIFO buffer 360 is empty at the end of the state duration. In the STALL state, any valid command continues the operation and thus, control transitions either to the DEAD TIME or to the ACTIVE TIME state. However, the STALL state, the controller 142 may be configured to be disabled, which causes the controller 142 to transition back to the IDLE state. It is noted that the PERSIST KILL state may be reached from any of the ACTIVE TIME, DEAD TIME, WAIT TIME, or STALL states, as depicted in FIG. 8.

Figure 9:
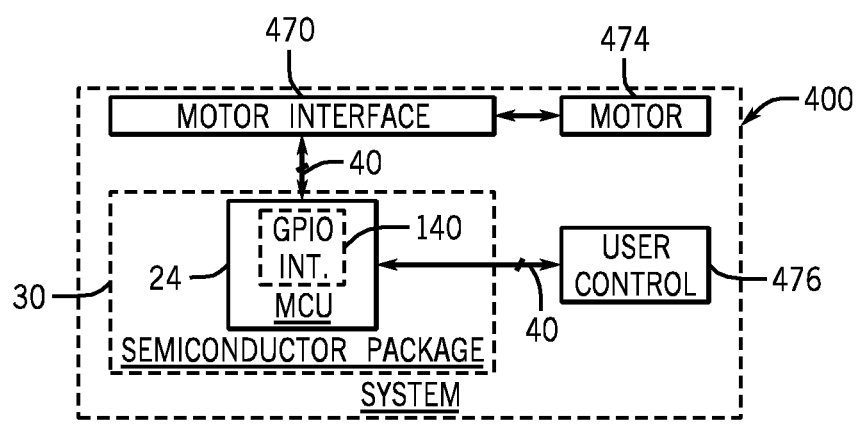
FIG. 9 is a schematic diagram of a motor control system according to an example embodiment.

The MCU 24 may be used in numerous different applications. As an example, FIG. 9 depicts a motor control application in which an MCU 24 of a motor control system 400 generates/receives input and output signals (I/O signals) for purposes of controlling a motor 474. In this manner, the GPIO interface 140 of the MCU 24 may generate signals at its I/O terminals 40 for purposes of communicating with a motor interface 470 (an interface containing drivers, sensors, and so forth); and in connection with this communication, the I/O terminals 40 may communicate waveforms with the motor interface (pulse width modulation (PWM) signals, for example), receive sensed currents and voltages, communicate data via one or more serial buses, and so forth. I/O terminals 40 of the GPIO interface 140 may further generate/receive signals to communicate with a user control interface 476 of the system 400 for such purposes as communicating status of the motor 474 or motor interface 470, communicating detected fault conditions, receiving user-directed commands and signals, and so forth.

While a limited number of embodiments have been disclosed herein, those skilled in the art, having the benefit of this disclosure, will appreciate numerous modifications and variations therefrom. It is intended that the appended claims cover all such modifications and variations.

What is claimed is:

1. An apparatus comprising:
an input/output (I/O) interface circuit comprising a controller and a memory;
wherein the memory is adapted to store a plurality of commands to regulate the I/O interface circuit, the commands indicate I/O states of the I/O interface circuit and time durations associated with the I/O states, and at least one of the commands has a format comprising at least one of a first field to control whether an associated I/O terminal of the I/O interface circuit is driven and used for sampling during the time duration and a second field to control whether a data direction for an associated I/O terminal of the I/O interface circuit is inverted; and
wherein the controller is adapted to execute the commands to place the I/O interface circuit in the I/O states in a predetermined sequence.

2. The apparatus of claim 1, wherein at least one of the commands of the plurality of commands indicates whether one of the I/O states is to be inverted, and the controller is adapted to execute the at least one command to selectively invert the I/O state in response to execution of the at least one command.

3. The apparatus of claim 1, wherein at least one of the commands indicates a sampling protocol for one of the I/O states, and the controller is adapted to regulate the sampling protocol in response to the execution of the at least one command.

4. The apparatus of claim 1, wherein at least one of the commands indicates a value to be driven to the associated I/O terminal, and the controller is adapted to execute the command to drive the terminal to the value.

5. The apparatus of claim 1, wherein the I/O interface circuit further comprises:
a direct memory access (DMA) interface adapted to retrieve the commands from another memory coupled to the I/O interface circuit.

6. The apparatus of claim 1, wherein the format further comprises:
a third field to control the time duration; and
a fourth field to control a value for an associated I/O terminal of the I/O interface circuit.

7. The apparatus of claim 1, wherein the I/O interface further comprises:
an interface adapted to allow a processor core coupled to the I/O interface to store the commands in the memory.

8. A method comprising:
storing a plurality of commands to regulate an input/output (I/O) interface circuit, wherein each command indicates I/O states for associated I/O terminals of the I/O interface circuit and time durations associated with the I/O states; and
executing the commands using a controller of the I/O interface circuit to regulate the at least one I/O state according to a predefined sequence, wherein executing the commands comprises regulating a sampling protocol based on a field of a command of the plurality of commands indicating whether an I/O terminal of the I/O terminals is to be used for sampling during the associated time duration.

9. The method of claim 8, wherein executing the commands comprises selectively driving an I/O terminal of the I/O interface circuit to a predefined value.

10. The method of claim 8, wherein storing the commands comprises using a processor core or a direct memory access (DMA) interface to store the commands in the memory.

11. An apparatus comprising:
an integrated circuit (IC) comprising:
a processor core;
an input/output (I/O) interface circuit;
a memory adapted to store a plurality of commands indicating at least one I/O state of at least one I/O terminal of the I/O interface circuit and a time duration associated with the I/O state, wherein at least one of the commands has a format comprising at least one of a first field to control whether an associated I/O terminal of the I/O interface circuit is driven and used for sampling during the time duration and a second field to control whether a data direction for an associated I/O terminal of the I/O interface circuit is inverted; and a controller adapted to execute the commands without intervention by the processor core to place the I/O interface circuit in the at least one I/O state according to a predefined sequence.

12. The apparatus of claim 11, further comprising:
a system bus coupled between the processor core and the memory; and
a direct memory access (DMA) interface adapted to access the system bus to retrieve the plurality of commands for subsequent storage in the memory.

13. The apparatus of claim 11, further comprising:
a system bus coupled between the memory and the processor core,
wherein the processor core is adapted to access the system bus to write the plurality of commands into the memory.

14. The apparatus of claim 11, wherein the controller is further adapted to execute at least one of the commands to selectively invert a direction of communication associated with an I/O terminal of the I/O interface circuit.

15. The apparatus of claim 11, wherein the controller is further adapted to execute at least one of the commands to regulate a sampling protocol associated with an I/O terminal of the I/O interface circuit.

16. The apparatus of claim 11, wherein the controller is further adapted to execute at least one of the commands to selectively drive an I/O terminal of the I/O interface circuit to a predefined value.

17. The apparatus of claim 11, wherein the controller is further adapted to asynchronously transition the I/O interface circuit to a safe state in response to a trigger external to the IC.

18. The apparatus of claim 11, wherein the format further comprises:

a third field to control the time duration; and a fourth field to control a value for an associated I/O terminal of the I/O interface.

19. A method comprising:

storing a plurality of commands to regulate an input/output (I/O) interface circuit, wherein each command indicates I/O states for associated I/O terminals of the I/O interface circuit and time durations associated with the I/O states; and executing the commands using a controller of the I/O interface circuit to regulate the at least one I/O state according to a predefined sequence, wherein executing the commands comprises selectively inverting a direction of communication associated with an I/O terminal of the I/O interface circuit in response to a command of the plurality of commands having a field indicating that the direction of communication is to be inverted.

* * * * *